United States Patent
Kubo

(10) Patent No.: US 8,786,227 B2
(45) Date of Patent: Jul. 22, 2014

(54) ELECTRIC COMPRESSOR CONTROLLER

(75) Inventor: Takashi Kubo, Saitama (JP)

(73) Assignee: Calsonic Kansei Corporation, Saitama-shi (JP)

(*) Notice: Subject to any disclaimer, the term of this patent is extended or adjusted under 35 U.S.C. 154(b) by 247 days.

(21) Appl. No.: 13/156,818

(22) Filed: Jun. 9, 2011

(65) Prior Publication Data

US 2012/0001575 A1  Jan. 5, 2012

(30) Foreign Application Priority Data

Jul. 2, 2010 (JP) .................................. 2010-152119

(51) Int. Cl.
*H02P 1/04* (2006.01)

(52) U.S. Cl.
USPC .............. 318/400.17; 318/400.08; 318/634; 318/641; 318/788; 318/792; 310/315; 310/16; 310/68 C

(58) Field of Classification Search
USPC .............. 318/400.17, 400.08, 634, 641, 788, 318/792; 310/315, 16, 68 C
See application file for complete search history.

(56) References Cited

U.S. PATENT DOCUMENTS

| | | | |
|---|---|---|---|
| 4,518,032 A * | 5/1985 | Funasaki et al. | 165/202 |
| 5,195,327 A | 3/1993 | Kim | |
| 5,809,793 A * | 9/1998 | Shutt et al. | 62/158 |
| 6,336,593 B1 * | 1/2002 | Bhatnagar | 236/78 R |
| 6,389,824 B2 * | 5/2002 | Ota et al. | 62/115 |
| 2008/0224643 A1 * | 9/2008 | Sakurai et al. | 318/471 |

FOREIGN PATENT DOCUMENTS

| | | |
|---|---|---|
| EP | 2 119 914 A1 | 11/2009 |
| JP | 2008-290523 A | 12/2008 |
| JP | 2009-264206 A | 11/2009 |

* cited by examiner

*Primary Examiner* — Erick Glass
(74) *Attorney, Agent, or Firm* — Foley & Lardner LLP

(57) ABSTRACT

An electric compressor controller includes a compressor that compresses refrigerant of an air conditioning system; a motor that drives the compressor; an inverter that selectively control switching elements based on PWM pulse signals to supply drive power to the motor and heats the refrigerant by heat generated due to switching of the switching elements during a heating operation; temperature detectors each detects junction temperature of each of the switching elements; a drive controller that supplies the pulse signals to the inverter to control the inverter; and a slope varying unit that variably controls precipitous degree of rising/falling slope waveforms of the pulse signals based on the junction temperature detected by the temperature detectors. According to the electric compressor controller, efficiency for heating refrigerant is improved, so that its own heating ability is improved.

4 Claims, 8 Drawing Sheets

| DATA | GATE RESISTANCE VALUE | GATE VOLTAGE WAVEFORM |
|---|---|---|
| 0x0000 | 17 × R | |
| 0x8000 | 16 × R | |
| ⋮ | ⋮ | |
| 0x0200 | 10 × R | |
| 0x0100 | 9 × R | |
| ⋮ | ⋮ | |
| 0x0002 | 2 × R | |
| 0x0001 | 1 × R | |

ELECTRIC COMPRESSOR CONTROLLER

BACKGROUND OF THE INVENTION

1. Field of the Invention

The present invention relates to an electric compressor controller that controls operations of the electric compressor provided in an air conditioning system for a vehicle.

2. Description of Related Art

A conventional control for an electric compressor is disclosed in Japanese Patent Application Laid-Open No. 2008-290523 (Patent Document 1). In this Patent Document 1, it is disclosed that outside air introduced form an outside of a vehicle is heated by a condenser and then introduced into a compartment. Then, heat is collected by a condenser from inside air to be discharged from the compartment is discharged and then the air is discharged to an outside of the compartment. Here, an operation of the compressor is stopped when room temperature is low. In this control, the heat is collected from the air to be discharged from the compartment and dehumidification is functioned even in an extremely low temperature state where a heat pump operation cannot be done due to negative suction pressure of refrigerant suctioned to the compressor.

In addition, another conventional control for an electric compressor is disclosed in Japanese Patent Application Laid-Open No. 2009-264206 (Patent Document 2). In this Patent Document 2, it is disclosed that heating is done by a heat pump operation and refrigerant is heated by Joule heat of an inverter when temperature of the refrigerant is low. In this control, dehumidification is done by increasing loss of the inverter without reversing heat pump cycle (without refrigeration cycle) if an external radiator is frosted.

SUMMARY OF THE INVENTION

According to the control disclosed in the Patent Document 1, needed is an electric heater with ability (capacity) to rise room temperature up to temperature enabling the heat pump operation in an extremely low temperature state lower than −20° C. Here, its heating ability can be supported by operating the electric heater when the heat pump is operated with room temperature higher than −20° C. Therefore, the electric heater with large ability is needed, so that power consumption is subject to become large.

Therefore, according to the control disclosed in the Patent Document 2, it is needed to heat the refrigerant by the Joule heat instead of heating by the electric heater when temperature of the refrigerant is low. In this case, heat generated by the inverter is controlled based on detected temperature of the refrigerant. Therefore, the heat available from the inverter is not utilized to a maximum extent, so that it may occur that the refrigerant is not heated sufficiently. As a result, a large electric heater may be needed to ensure heating ability.

Therefore, an object of the present invention is to provide an electric compressor controller that improves efficiency for heating refrigerant to improve its own heating ability.

An aspect of the present invention is to provide an electric compressor controller that includes a compressor that compresses refrigerant of an air conditioning system for a vehicle; a motor that drives the compressor; an inverter that selectively control a plurality of switching elements based on PWM pulse signals to supply drive power to the motor and heats the refrigerant by heat generated due to switching of the plurality of switching elements during a heating operation of the air conditioning system; a plurality of temperature detectors each detects junction temperature of each of the plurality of switching elements; a drive controller that supplies the pulse signals to the inverter to control the inverter; and a slope varying unit that variably controls precipitous degree of rising/falling slope waveforms of the pulse signals based on the junction temperature of each of the plurality of switching elements that is detected by the plurality of temperature detectors.

According to the aspect of the present invention, efficiency for heating refrigerant can be improved, so that its own heating ability can be improved. As a result, a supplemental heating device for ensuring the heating ability such as an electric heater can be downsized.

DETAILED DESCRIPTION OF THE EMBODIMENT

Hereinafter, an embodiment according will be explained with reference to the drawings.

Figure 1:
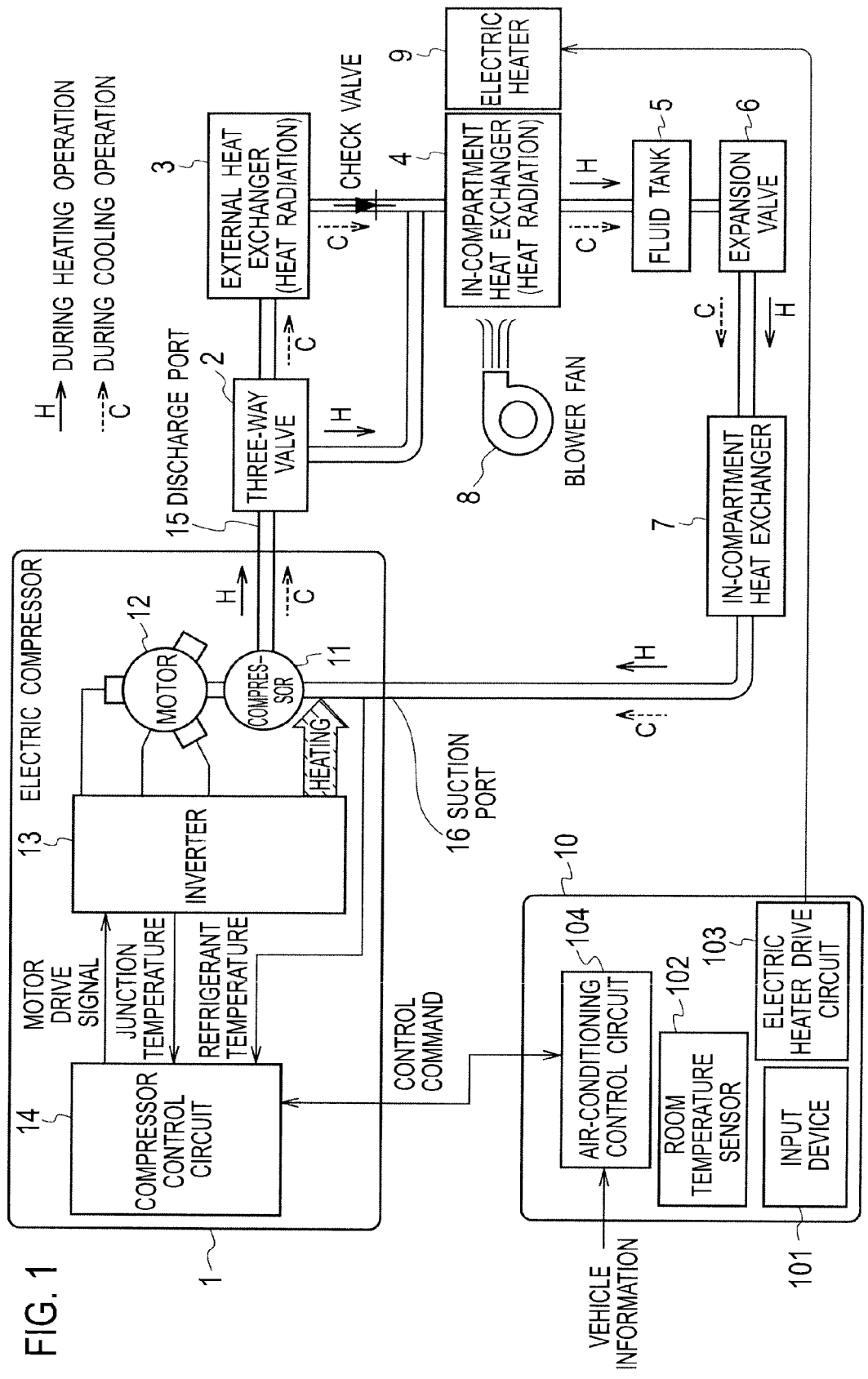
FIG. 1 is a configuration diagram of an air conditioning system for a vehicle that includes an electric compressor controller that according to a first embodiment.

FIG. 1 shows an air conditioning system for a vehicle to which an electric compressor controller according to the present embodiment is applied. The vehicle is a hybrid electric vehicle (HEV) including both an internal combustion engine and an electric motor as its drive sources or an electric vehicle (EV) including only an electric motor as its driving source.

Figure 2:
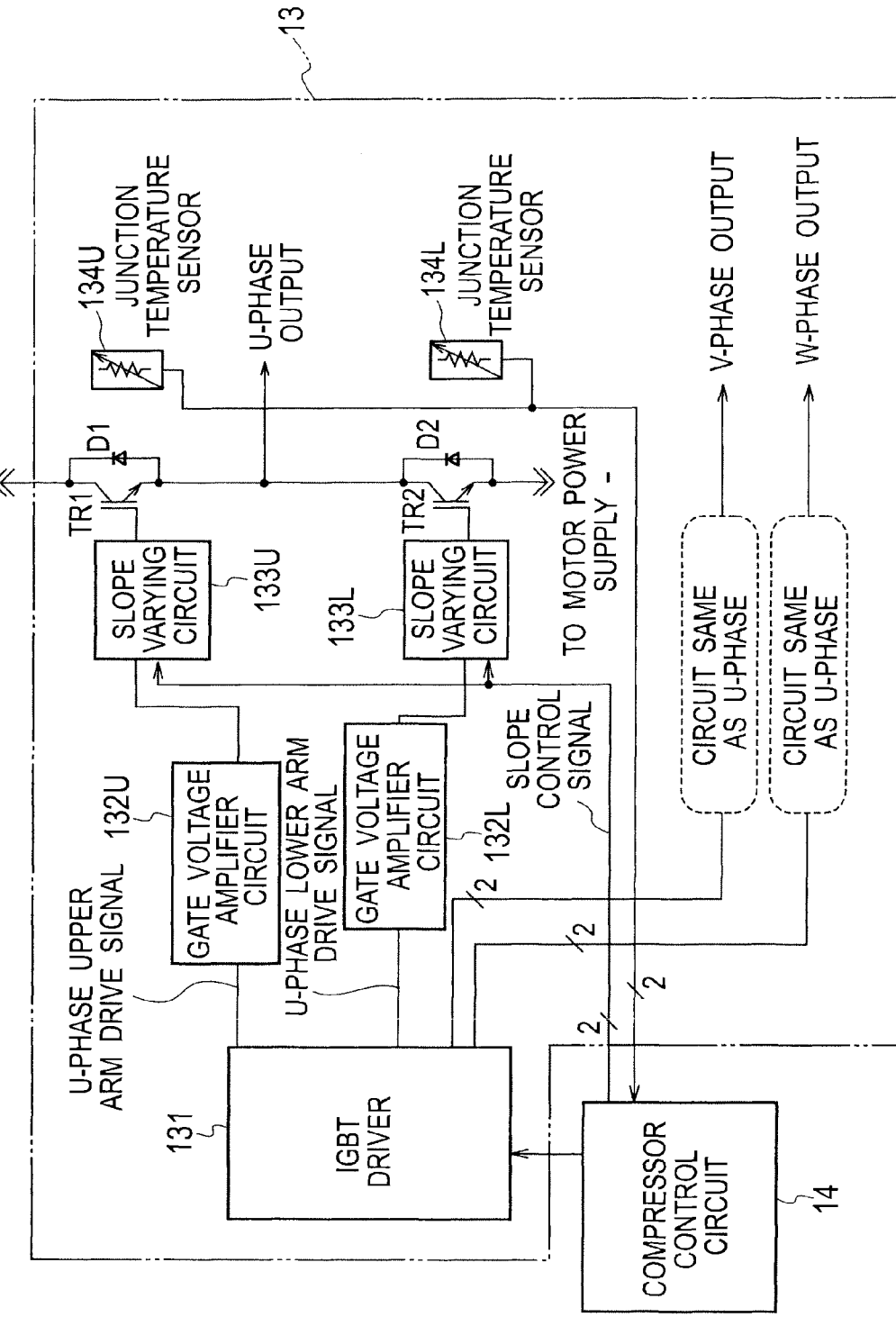
FIG. 2 is a configuration diagram of an inverter in the first embodiment.

An electric compressor 1 controlled by the compressor controller includes a compressor 11, a motor 12, and an inverter 13. The compressor 11 compresses refrigerant of the air conditioning system. The motor 12 drives the compressor 11. The inverter 13 controls switching of the switching elements based on pulse signals of a PWM (pulse-width modulation) control to supply drive power to the motor 12. The compressor controller radiates heat generated due to switching of the switching elements during a heating operation of the air conditioning system to the refrigerant. The compressor 1 further includes a compressor control circuit 14 that controls the inverter 13 together with an IGBT (insulated gate bipolar transistor) driver 131 (see FIG. 2). The compressor control circuit 14 and the IGBT driver 131 function as a drive controller that supplies the pulse signals to the inverter 13 to drive the inverter 13. As shown in FIG. 2, the inverter 13 includes, in addition to the IGBT driver 131, junction temperature sensors (temperature detectors) 134U and 134L for detecting junction temperatures of the switching elements in the inverter 13. The inverter 13 further includes slope varying circuits (slope varying unit[s]) 133U and 133L that variably controls a precipitous degree of rising/falling slope waveforms of the pulse signals.

As shown in 1, in the air conditioning system, a heat pump is configured by the electric compressor 1, a three-way valve 2, an external heat exchanger 3, an in-compartment heat exchanger 4, a fluid tank 5, an expansion valve 6 and another in-compartment heat exchanger 7. The above components are connected through pipes and the refrigerant is circulated through the components. In addition, the air conditioning system includes a blower fan 8, an electric heater 9 and an A/C (air conditioner) controller 10, and operates cooling/heating operations by changing flow path of the refrigerant. As mentioned above, the electric compressor 1 includes the compressor 11, the motor 12, the inverter 13 and the compressor control circuit 14.

The compressor 11 is driven by the motor 12 that is a three-phase synchronous AC motor with U-, V- and W-phases. The compressor 11 suctions low-temperature/low-pressure refrigerant evaporated at the in-compartment heat exchanger 7 through its suction port 16 and compress the refrigerant. The compressor 11 discharges high-temperature/high-pressure refrigerant that has been compressed by the compressor 11 from its discharge port 15. The discharged refrigerant is supplied to the external heat exchanger or the in-compartment heat exchanger 4 via the three-way valve 12, so that recirculated in the system.

The motor 12 is driven by three-phase AC power generated by the inverter 13. The inverter 13 supplies driving electric power to the motor 12 according to PWM pulse signals generated under control of the compressor control circuit.

The inverter 13 generates the AC power from DC power supplied form a battery on the vehicle to supply the generated AC power to the motor 12 as the driving electric power. The inverter 13 is configured as shown in FIG. 2 explained later.

The compressor control circuit 14 outputs a command signal for generating the pulse signals to the inverter 13 based on a control command from the A/C controller 10 and the junction temperatures of the inverter 13, so that controls driving of the inverter 13.

Note that the compressor 11, the motor 12, the inverter 13 and the compressor control circuit 14 are integrated to configure the electric compressor 1.

The three-way valve 12 changes the flow path of the refrigerant discharged from the electric compressor 1 to a side of the external heat exchanger 3 during a cooling operation or to another side of the in-compartment heat exchanger 4 during a heating operation.

The external heat exchanger 3 radiates heat of the high-temperature/high-pressure refrigerant discharged from the electric compressor 1 to external air. In other words, the external heat exchanger 3 exchanges heat between the high-temperature/high-pressure refrigerant discharged from the electric compressor 1 and the external air.

The in-compartment heat exchanger 4 radiates heat of the high-temperature/high-pressure refrigerant discharged from the electric compressor 1 to air supplied by the blower fan 8. In other words, the in-compartment heat exchanger 4 exchanges heat between the high-temperature/high-pressure refrigerant discharged from the electric compressor 1 and the air supplied by the blower fan 8. The air heated by the in-compartment heat exchanger 4 is supplied into a compartment. The refrigerant is cooled at the in-compartment heat exchanger 4, so that condensed into fluid.

The fluid tank 5 separates the refrigerant condensed at the in-compartment heat exchanger 4 into gas and fluid, and supplies only the fluid refrigerant to the expansion valve 6.

The expansion valve 6 expands the fluid refrigerant from the fluid tank 5 (reduces pressure of the fluid refrigerant) into low-temperature/low-pressure refrigerant, and supplies the low-temperature/low-pressure refrigerant to the in-compartment heat exchanger 7.

The in-compartment heat exchanger 7 exchanges heat between the refrigerant and in-compartment air to cool the in-compartment air. In addition, the in-compartment heat exchanger 7, during a heating operation, exchanges heat between the refrigerant and the in-compartment air to dehumidify the compartment (or defrost a window[s]).

The electrical heater 9 radiates heat to ensure the heating ability when heating by the in-compartment heat exchanger 4 is insufficient during a heating operation. In addition, the electric heater 9 is operated to heat the compartment when room temperature is such that a heat pump operation cannot be done in the present system.

According to the above-mentioned configuration, the refrigerant circulates along solid arrows H shown in FIG. 2 during a heating operation, and along dotted arrows C during a cooling operation.

The A/C controller 10 functions as a control nerve that controls operations of the present system, and, for example, configured of a micro computer or the like including resources such as a CPU, a memory storage and I/O devices, which are needed for a computer which various operational processes based on programs. The A/C controller 10 retrieves information needed for operations of the present system such as after-mentioned vehicle information, room temperature and operational input including operations/stop of the present system. The A/C controller 10 sends commands to the components in the present system such as the electric compressor 1 and the electric heater 9 based on the various retrieved information and control logics (programs) previously stored internally. Thus, the A/C controller 10 centrally controls processes needed for heating/cooling operations or stop thereof in the present system.

The A/C controller 10 includes an input device 101, a room temperature sensor 102, an electric heater drive circuit 103 and an air conditioning (A/C) control circuit 104. An occupant can preset desired room temperature through the input device 101, and the input device 101 sends the preset temperature to the A/C control circuit 104. The room temperature sensor 102 detects room temperature and sends the detected room temperature to the A/C control circuit 104. The electric heater drive circuit 103 outputs a drive signal to the electric heater 9 to control the electric heater 9. The A/C control circuit 104 generates a control command (rotational speed of the motor 12) for closing a gap between the preset temperature and the room temperature with reference to the vehicle information (vehicle condition), and then outputs the control command to the electric compressor 1. Vehicle running speed and engine rotational speed are retrieved as the vehicle information.

Here, when a heating operation is done using the heat pump in the present system, a heated portion of the inverter 13 is made closer to the suction port 16 of the compressor 11 to reduce thermal resistance between the heated portion and the suction port 16. As a result, heat generated at the inverter 13 is transferred to the refrigerant, so that the refrigerant is heated.

As shown in FIG. 2, the inverter 13 is a voltage-source inverter that generates three-phase AC power for driving the motor 12 from DC power applied from the battery (not shown) and applies the AC power to the motor 12. Although only a circuit of the U-phase is shown in FIG. 2 to simplify explanation and drawing, both circuits of the V- and W-phases are same as that of the U-phase.

The inverter 13 includes two transistors TR1 and TR2 each is composed of an IGBT and functions as a switching element, and diodes D1 and D2 that are connected anti-parallel to the transistors TR1 and TR2, respectively. The upper-side transistor TR1 and the lower-side transistor TR2 are connected in series and the series circuit is connected with the IGBT driver 131 in parallel.

The series circuit of the transistors TR1 and TR2 configures an arm circuit of one of the three-phases (U, V and W phases) of the AC power. Note that, in the arm of the U-phase, the transistor TR1 and the diode D1 configures an upstream (upper) arm, and the transistor TR2 and the diode D2 configures a downstream (lower) arm. The transistors TR1 and TR2 are PWM-controlled by the IGBT driver 131 to generate the three-phase AC power for driving the motor 12.

The IGBT driver 131 controls switching of the transistors TR1 and TR2 at an appropriate timing based on a PWM command input from the compressor control circuit 14 to generate the pulse signals of the PWM control. The IGBT driver 131 outputs the pulse signals generated for the transistors TR1 and TR2 to gate voltage amplifier circuits 132U and 132L, respectively.

In the upper and lower arms, the gate voltage amplifier circuits 132U and 132L and slope varying circuits 133U and 133L are provided between the IGBT driver 131 and the transistors TR1 and TR2, respectively.

The gate voltage amplifier circuit 132U receives the pulse signal of the U-phase upper side output from the IGBT driver 131, and amplifies a voltage of the pulse signal up to a voltage appropriate for a gate voltage of the transistor TR1 to output the amplified pulse signal to the slope varying circuit 133U. Similarly, the gate voltage amplifier circuit 132L receives the pulse signal of the U-phase lower side output from the IGBT driver 131, and amplifies a voltage of the pulse signal up to a voltage adequate for a gate voltage of the transistor TR2 to output the amplified pulse signal to the slope varying circuit 133L.

The slope varying circuit 133U variably controls a rising/falling slope of a waveform of the pulse signal that is input from the voltage amplifier circuit 132U and to be output to a gate of the transistor TR1. This variable control is achieved based on a slope control signal given from the compressor control circuit 14. Similarly, the slope varying circuit 133L variably controls a rising/falling slope of a waveform of the pulse signal that is input from the voltage amplifier circuit 132L and to be output to a gate of the transistor TR2. This variable control is achieved based on a slope control signal given from the compressor control circuit 14.

The transistors TR1 and TR2 are provided with the junction temperature sensors 134U and 134L that detect junction temperatures of the transistors TR1 and TR2, respectively. The junction temperatures of the transistors TR1 and TR2 detected by the junction temperature sensors 134U and 134L is given to the compressor control circuit 14.

Figure 3:
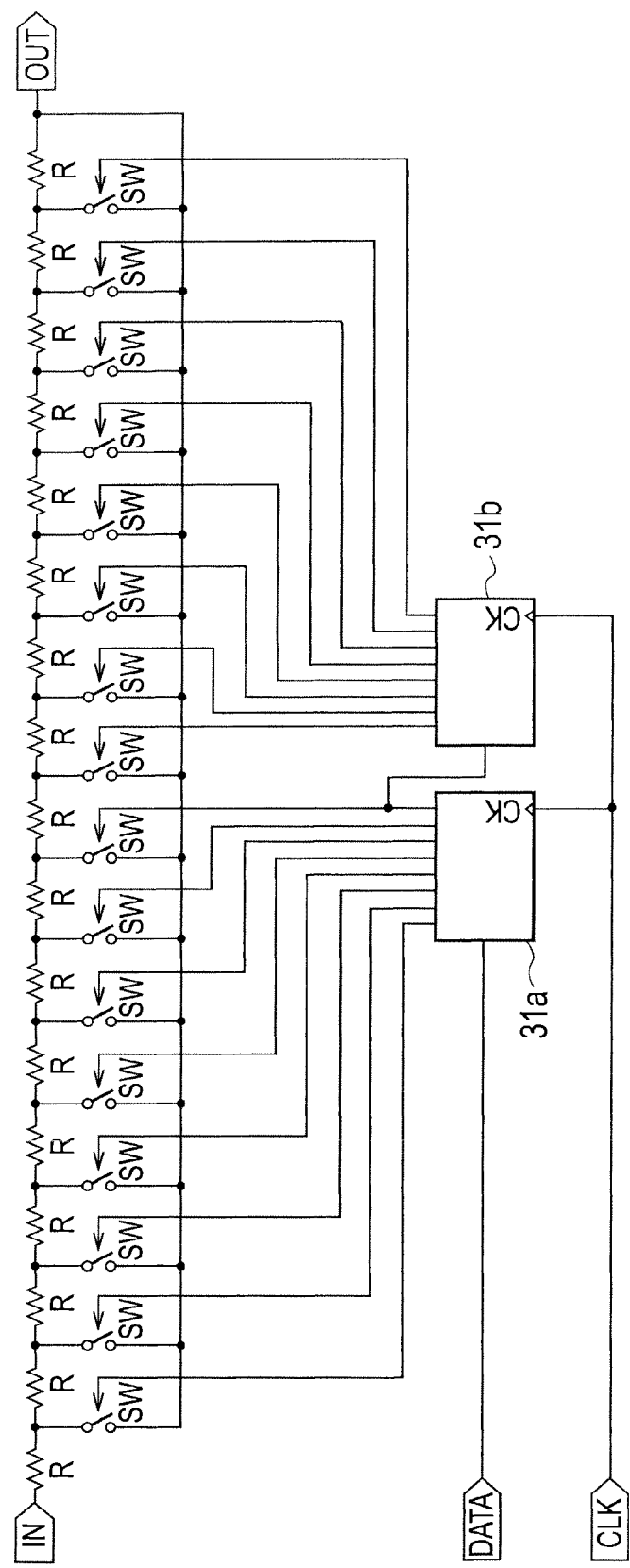
FIG. 3 is a configuration diagram of a slope varying circuit in the first embodiment.

As shown in FIG. 3, slope varying circuits 133U and 133L variably control slopes of waveforms of the pulse signals by variably controlling the number of resistances R using switches SW. The resistances R are connected in serial between an input and an output (IN-OUT) in a resistance network. The switches SW are open/closed by switching signals output from the switching control circuits 31a and 31b based on 16 bits data (DATA) that are input in serial in synchronization with a clock signal. Here, the slope control signal given from the compressor control circuit 14 is configured by the clock signal and the 16 bits data (DATA0 to DATA15) as shown in FIG. 4.

Figures 4, 5:
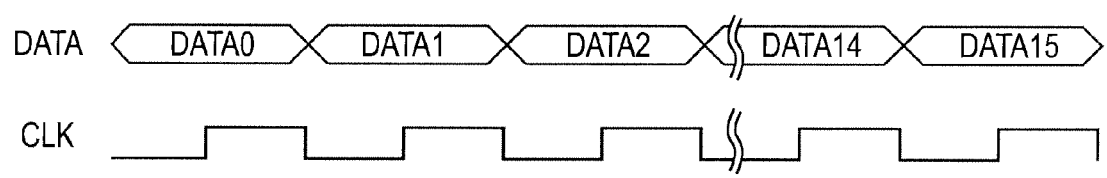
FIG. 4 is a timing chart of data (DATA) and clock signal (CLK) that are input into the slope varying circuit.
FIG. 5 shows relationship among the data (DATA), a resistance value of the slope varying circuit, and a waveform of a pulse signal.
Figure 6:
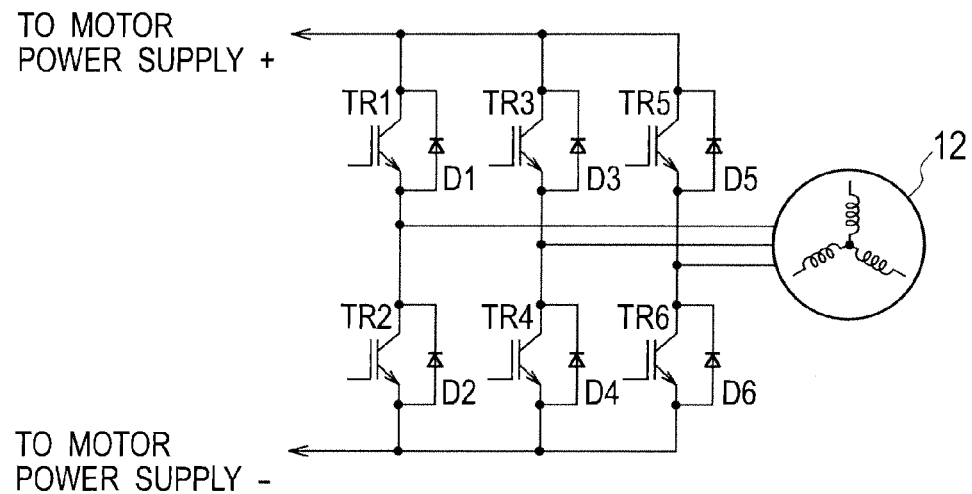
FIG. 6 is a configuration drawing of IGBTs in the inverter.

When each resistance value of the resistances R in the resistance network is R, FIG. 5 shows relationship among an available total resistance value (1×R to 17×R), a gate voltage waveform of the pulse signal to be supplied to the gates of the transistors TR1 and TR2, and the data (DATA). For example, all the switches SW are opened, the total resistance value of the resistances R connected in series is set to its maximum value (17×R), so that the pulse signal has most gradual slopes (a precipitous degree is smallest). When the pulse signals having most gradual slopes are applied to the transistors TR1 to TR6 (see FIG. 6) that configures three phases (U-phase, V-phase and W-phase) of the inverter 13 to drive the motor 12, switching losses of the inverter 13 becomes largest among the available slopes in the present embodiment. As a result, an amount of heat (Joule heat) generated due to the switching losses becomes largest among the available slopes in the present embodiment.

On the other hand, when only one of the switches SW locating closest to an input side (IN) is closed, the total resistance value of the resistances R connected in series is set to its minimum value (1×R), so that the pulse signal has steepest slopes (the precipitous degree is largest). When the pulse signals having steepest slopes are applied to the transistors TR1 to TR6 (see FIG. 6) that configures three phases (U-phase, V-phase and W-phase) of the inverter 13 to drive the motor 12, switching losses of the inverter 13 becomes smallest among the available slopes in the present embodiment. As a result, amount of heat (Joule heat) generated due to the switching losses becomes smallest among the available slopes in the present embodiment.

The slope varying circuits 133U and 133L as mentioned above can be configured by a known digital potentiometer or the like, for example.

Figure 7:
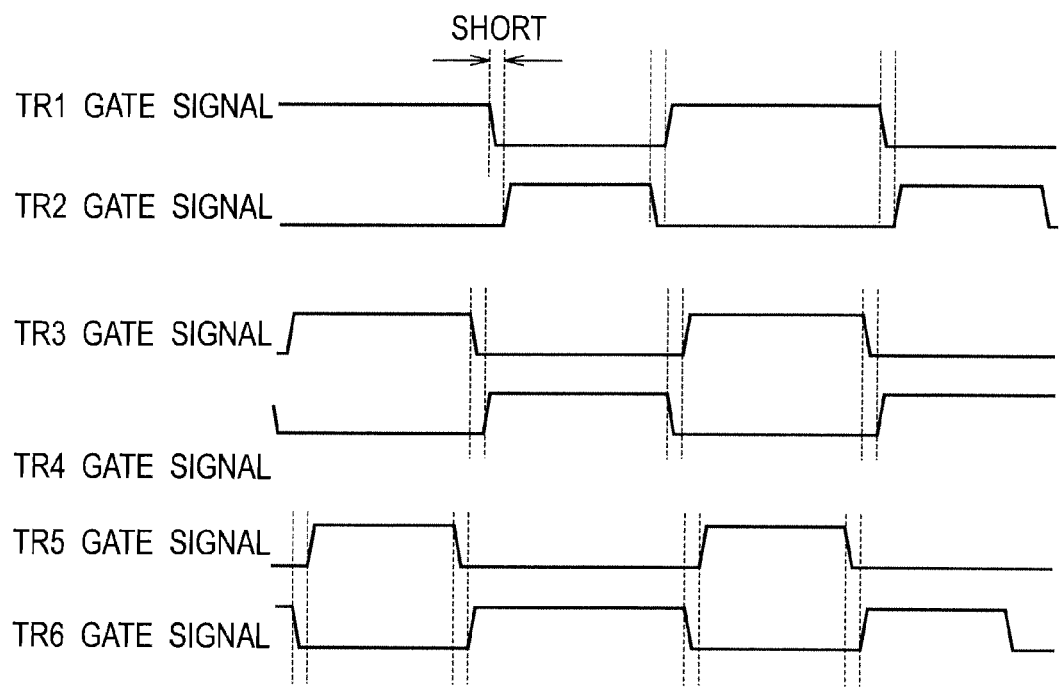
FIG. 7 shows an example of waveforms of gate signals that are input into gates of the IGBTs in the inverter.
Figure 8:
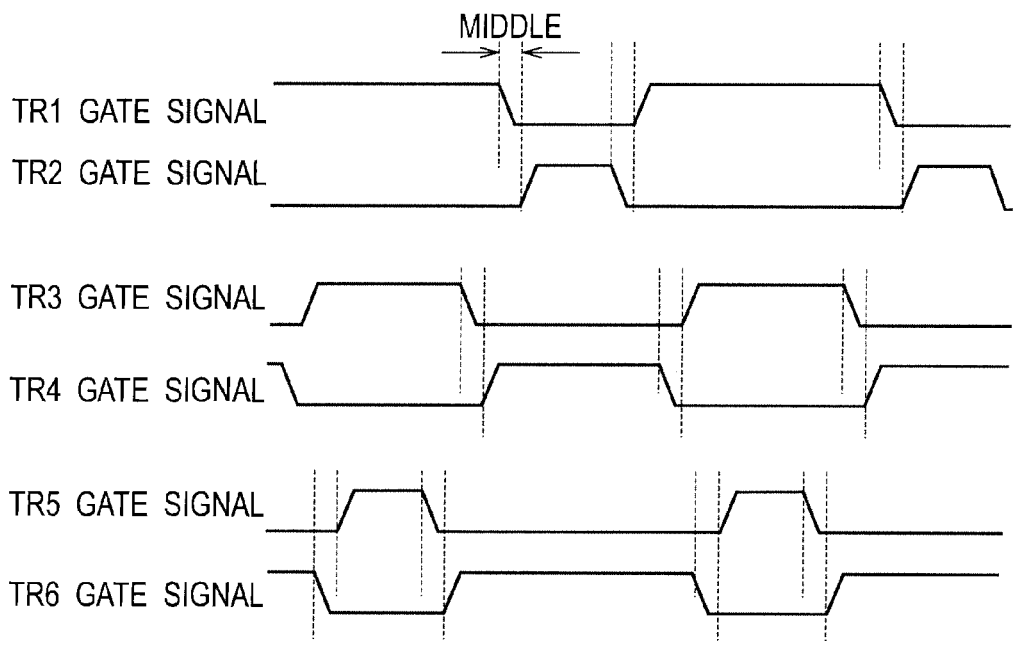
FIG. 8 shows another example of waveforms of gate signals that are input into gates of the IGBTs in the inverter.
Figure 9:
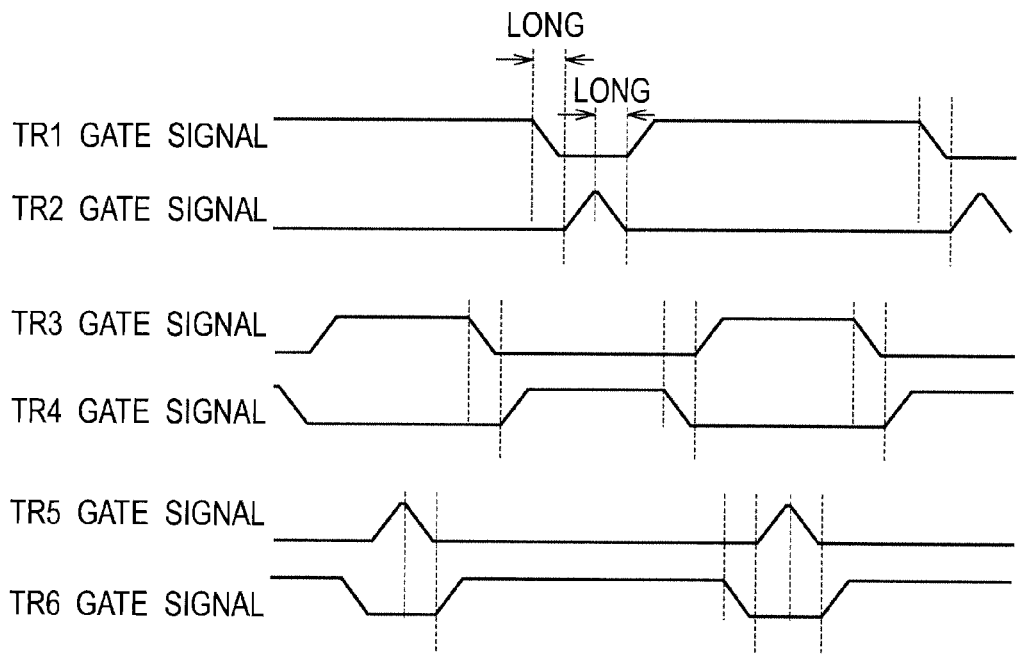
FIG. 9 shows yet another example of waveforms of gate signals that are input into gates of the IGBTs in the inverter.

The gate signal (pulse signal) given to each gate of the transistors TR1 to TR6 (see FIG. 6) that configures three phases (U-phase, V-phase and W-phase) of the inverter 13 is generally classified into three types according to its precipitous degree, i.e. the largest precipitous degree (the smallest resistance value) shown in FIG. 7, the smallest precipitous degree (the largest resistance value) shown in FIG. 9, and a medium precipitous degree (between the smallest and largest resistance values) shown in FIG. 8. According to these variations in the precipitous degrees of the slopes, a dead time is variably set in order to prevent flow-through current from flowing through the upper-side and lower-side transistors upon making the transistors concurrently switched-on. This dead time is experimentally obtained and then set to each of the precipitous degrees of the slopes.

Next, an air conditioning operation by the present system will be explained with reference to flow charts shown in FIGS. 10 to 12.

Figure 10:
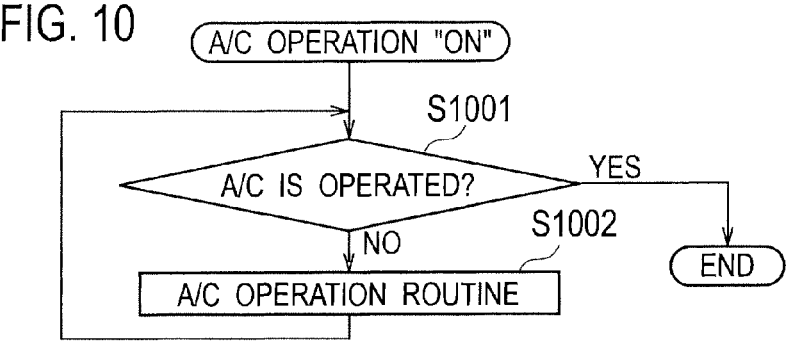
FIG. 10 is a flow chart that shows a part of operations of the air conditioning system for a vehicle.
Figure 11:
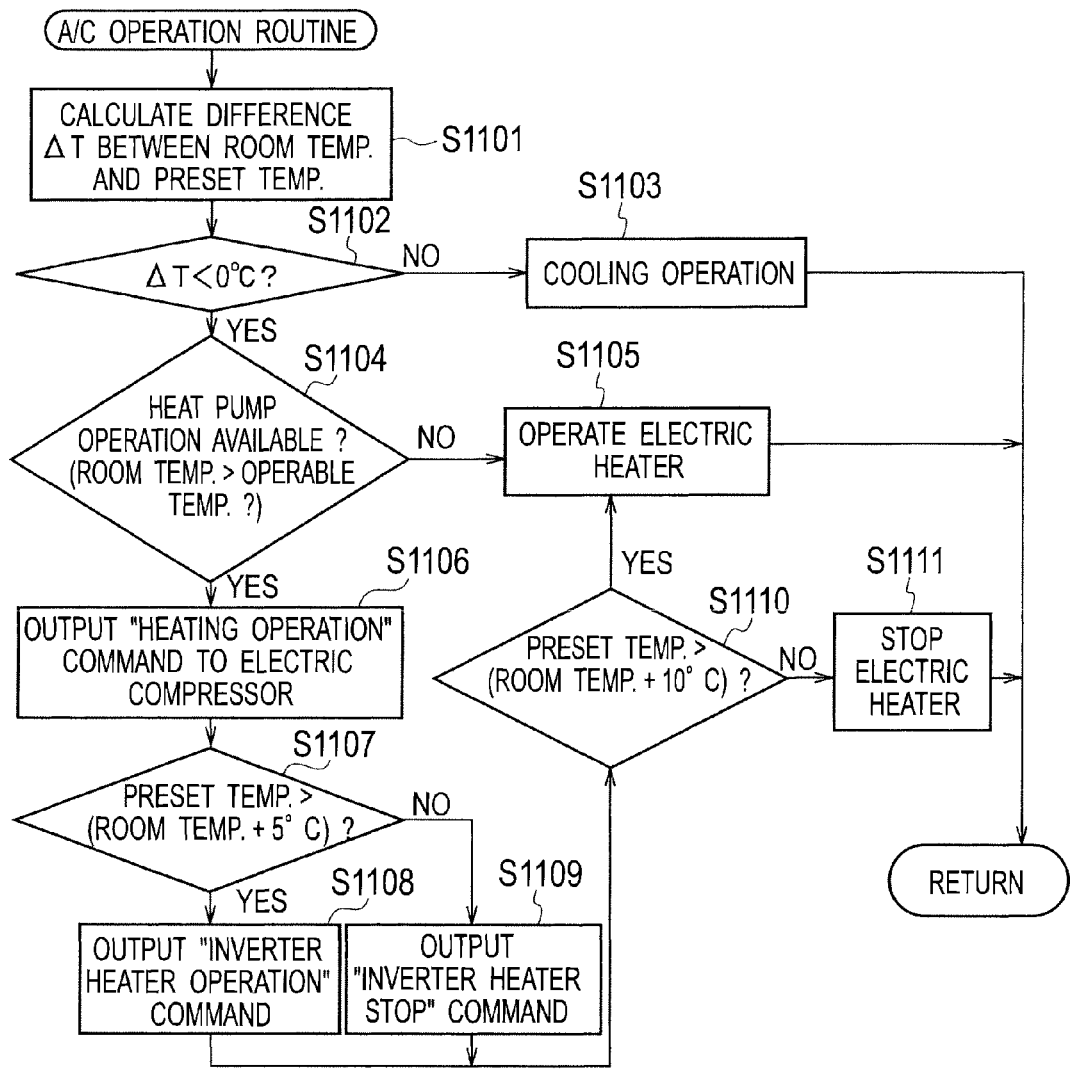
FIG. 11 is a flow chart that shows operations of a controller of the air conditioning system for a vehicle.

As shown by the flow chart in FIG. 10, it is firstly judged whether or not the present system (air conditioner) is operated by an occupant in a vehicle (step S1001). When the air conditioner was operated (YES in step S1001), a process flow is terminated. On the other hand, when the air conditioner was not operated (NO in step S1001), the process flow transitions to an air conditioning (A/C) operation routine shown by the flow chart in FIG. 11 (step S1002).

In the A/C operation routine executed by the A/C controller 10, temperature difference ΔT between the room temperature and the preset temperature preset by the occupant is calculated (step S1101). Then, it is judged whether or not the temperature difference ΔT is smaller than 0° C. (step S1102). When the temperature difference ΔT is not smaller than 0° C. (NO in step S1102), i.e. the room temperature is high, a cooling operation is conducted (step S1103).

On the other hand, when the temperature difference ΔT is smaller than 0° C. (YES in step S1102), i.e. the room temperature is low, it is judged subsequently whether or not a heat pump operation in the present system is available (step S1104). Availability of the heat pump operation is judged by judging whether or not the room temperature is higher than a predetermined temperature operable to conduct the heat pump operation. There the predetermined operable temperature is set according to specification of an air conditioning system, and is set to −5° C. or so in the present system.

When the room temperature is not higher than the operable temperature (NO in step S1104), it is judged that the heat pump operation is unavailable, so that the electric heater 9 is operated to heat the compartment (step S1105). On the other hand, when the room temperature is higher than the operable temperature (YES in step S1104), a heating operation command is sent to the electric compressor 1 as a control command from the air conditioner and the A/C controller 10 (step S1106).

Then, it is judged whether or not the preset temperature mentioned in the above step S1101 is higher than "the room temperature+5° C." (step S1107). When the preset temperature is higher than "the room temperature+5° C." (YES in step S1107), a command to heat the refrigerant using the Joule heat generated in the inverter 13 is output (step S1108). In other words, the inverter 13 is used as an inverter heater in this case. On the other hand, when the preset temperature is not higher than "the room temperature+5° C." (NO in step S1107), it is judged that the inverter heater is not needed. If the inverter heater is being operated, operation of the inverter heater is stopped (step S1109).

Subsequently, it is judged whether or not the preset temperature mentioned in the above steps S1101 and S1107 is higher than "the room temperature+10° C." (step S1110). When the preset temperature is higher than "the room temperature+10° C." (YES in step S1110), it is assumed that the heating ability is insufficient, so that the electric heater 9 is operated to ensure the heating ability (step S1105). On the other hand, when the preset temperature is not higher than "the room temperature+10° C." (NO in step S1110), it is judged that the beating ability by the heat pump operation in the present system is sufficient. If the electric heater 9 is being operated, operation of the electric heater 9 is stopped (step S1111). The operation routine described above is conducted repeated until an operation to the air conditioner is made.

Next, operation of the inverter heater that is mentioned in the above step S1108 and executed by the compressor control circuit 14 will be explained with reference to the flow chart shown in FIG. 12.

Figure 12:
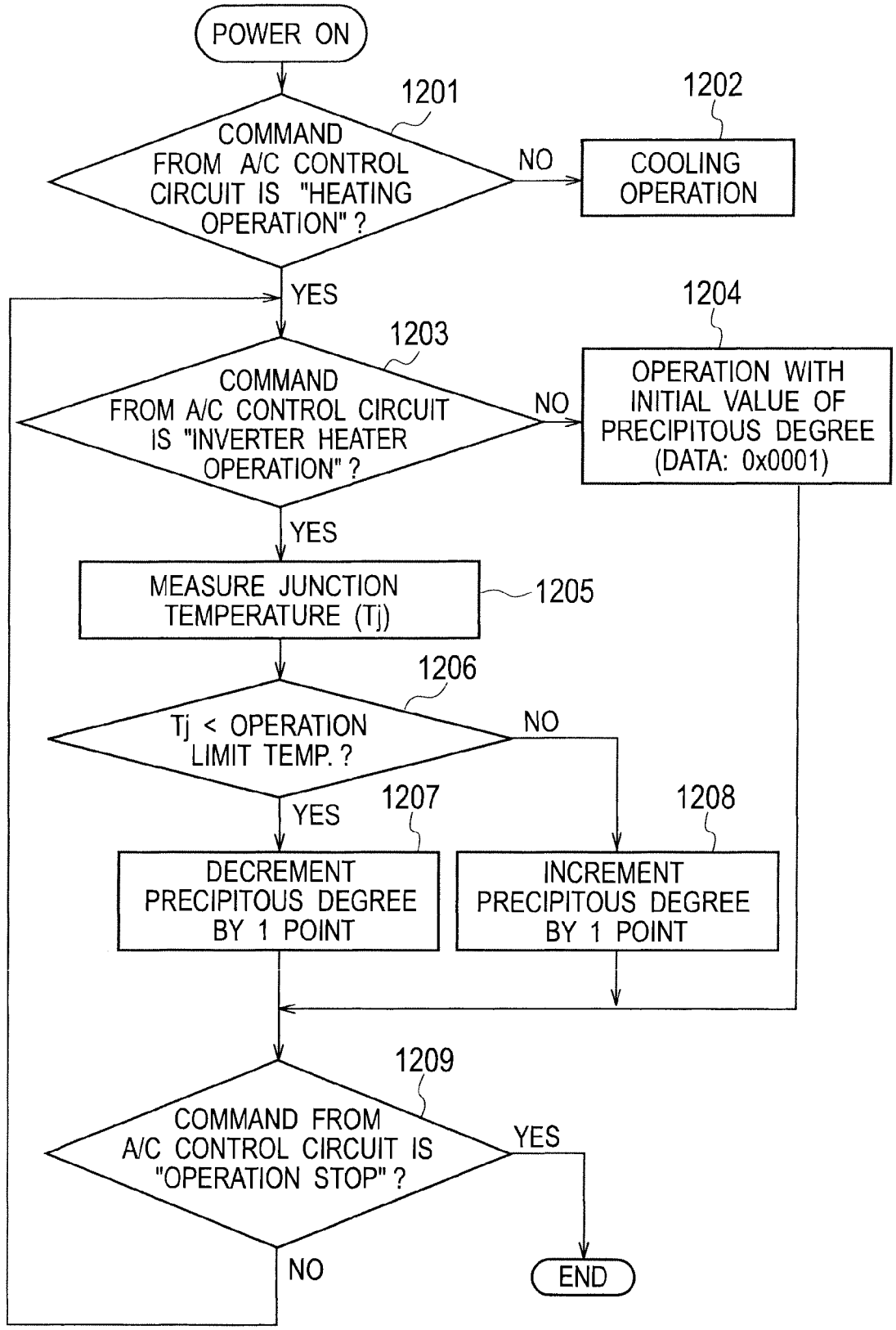
FIG. 12 is a flow chart that shows operations of the electric compressor.

As shown by the flow chart in FIG. 12, it is firstly judged whether or not the heating operation command (see step S1106) has been output to the electric compressor 1 from the compressor control circuit 14 in the A/C controller 10 after the air conditioner is turned on (step S1201). When the heating operation command is not output (NO in step S1201), a cooling operation is conducted (step S1202).

On the other hand, when the heating operation command has been output (YES in step S1201), it is judged whether or not the inverter heater operation command (see S1108) has been further output to the electric compressor 1 from the compressor control circuit 14 in the A/C controller 10 (step S1203). When the inverter heater operation command has not been output (NO in step S1203), the slopes of the waveform of the pulse signals are set to its default among the waveforms shown in FIGS. 7 to 9 (the precipitous degree is set to its initial value) (step S1204). Specifically, the total resistance value in the slope varying circuits 133U and 133L is set to its minimum to make the slopes steepest in the present system.

On the other hand, when the inverter heater operation command has been output (YES in step S1203), the junction temperatures (Tj) of the transistors TR1 and TR2 are measured by the junction temperature sensors 134U and 134L provided at the transistors TR1 and TR2 in the inverter 13 (step S1205). Note that the junction temperatures (Tj) are similarly measured in the V-phase and the W-phase of the inverter 13.

After the measurement of the junction temperatures (Tj), it is judged whether or not each of the junction temperatures (Tj) is lower than an operation limit temperature of each of the transistors of the phases (step S1206). Although the operation limit temperature may vary according to each specification of the transistors, it is set to 120° C. or so in the present system.

When the junction temperature (Tj) is lower than the operation limit temperature (YES in step S1206), it is assumed that the inverter 13 can radiate heat further, so that the precipitous degree of the slopes is decremented by 1 point (step S1207). In other words, the number of the resistances connected in series in the slope varying circuits 133U and 133L is increased to increase the total resistant value by one degree. As a result, the slopes of the pulse signals are made gradual by one degree. Therefore, the switching losses of the inverter 13 become larger than before, so that the Joule heat generated due to the switching losses is increased. The generated Joule heat is given to the refrigerant to be suctioned into the compressor 11, and then effect for heating the refrigerant can be improved more than before.

On the other hand, the junction temperature (Tj) is not lower than the operation limit temperature (NO in step S1206), it is assumed that the inverter 13 is heated up to the operation limit temperature and its further radiating operation is not preferable, so that the precipitous degree of the slopes is incremented by 1 point (step S1208). In other words, the number of the resistances connected in series in the slope varying circuits 133U and 133L is decreased to decrease the total resistant value by one degree. As a result, the slopes of the pulse signals are made steep by one degree. Therefore, the switching losses of the inverter 13 become smaller than before, so that the Joule heat generated due to the switching losses is decreased to restrict heat radiation by the inverter 13.

Subsequently to the initial process in the above mentioned step S1204 or the process for varying precipitous degree of the slopes in the above step S1207 or S1208, it is judged whether or not an operation stop command for stopping operations of the system has been output from the A/C control circuit 104 (step S109). When the operation stop command has been output (YES in step S1209), a series of the processings shown by the flow charts in FIGS. 10 to 12 is terminated. On the other hand, when the operation stop command has not been output (NO in step S1209), the process flow returned to the step S1203 to judge again whether or not the inverter heater operation command has been output.

According to the present system, when the inverter heater operation for heating the refrigerant using the Joule heat generated by the inverter 13 is conducted, the inverter 13 is operated as the inverter heater within a scope wherein the junction temperatures (Tj) of the transistors in the inverter 13 does not excess over their operation limit temperature. Specifically, the amount of the Joule heat generated due to the switching losses of the transistors in the inverter 13 is made large as much as possible by making the switching losses larger. Therefore, efficiency for heating the refrigerant can be improved more then before, so that the heating ability of the heat pump can be improved. As a result, the ability (capacity) of the electric heater 9 provided as a supplemental heating device for compensating insufficiency of the heating ability can be made small. Therefore, the electric heater 9 can be downsized, so that its power consumption can be reduced. According to the present system, an air conditioning system to be applied adequately to an HEV or an EV can be provided.

In addition, radiated sound generated at the inverter 13 can be reduced by driving the inverter 13 with the slopes of the pulse signals made gradual. Further, when driving the motor 12 with the inverter 13 in such a condition, radiated sound generated at the motor 12 can be also reduced. Furthermore, radiant electromagnetic noises can be reduced by driving the compressor 11 using the inverter 13 with the slopes of the pulse signals made gradual.

This application claims priority from Japanese Patent Application 2010-152119, filed Jul. 2, 2010, which is incorporated herein by reference in its entirety.

What is claimed is:

1. An electric compressor controller comprising:
a compressor that compresses refrigerant of an air conditioning system for a vehicle;
a motor that drives the compressor; an inverter that selectively controls a plurality of switching elements based on PWM pulse signals to supply drive power to the motor and heats the refrigerant by heat generated due to switching of the plurality of switching elements during a heating operation of the air conditioning system;
a plurality of temperature detectors that each detects junction temperature of each of the plurality of switching elements;
a drive controller that supplies the pulse signals to the inverter to control the inverter; and
a slope varying unit that variably controls a precipitous degree of rising/falling slope waveforms of the pulse signals based on the junction temperature of each of the plurality of switching elements that is detected by the plurality of temperature detectors.

2. The electric compressor controller according to claim 1, wherein, an amount of the heat generated due to switching of the plurality of switching elements is increased by increasing switching losses of the plurality of switching elements within a scope wherein the junction temperature of the plurality of switching elements does not exceed an operation limit temperature thereof.

3. The electric compressor controller according to claim 2, wherein, the slope varying unit increases the switching losses by making a precipitous degree of the pulse signals gradual.

4. The electric compressor controller according to claim 1, wherein, a dead time for preventing flow-through current from flowing through the plurality of switching elements is variably set to the pulse signals according to the precipitous degree.

* * * * *